(12) United States Patent
Chipperfield

(10) Patent No.: US 6,837,205 B1
(45) Date of Patent: Jan. 4, 2005

(54) INTERNAL COMBUSTION ENGINE

(76) Inventor: Richard F. Chipperfield, 59 Brookside Dr., Charlestown, RI (US) 02813

( * ) Notice: Subject to any disclaimer, the term of this patent is extended or adjusted under 35 U.S.C. 154(b) by 29 days.

(21) Appl. No.: 10/281,633

(22) Filed: Oct. 28, 2002

(51) Int. Cl.[7] .................................................. F02F 1/00
(52) U.S. Cl. .................................... 123/193.6; 277/437
(58) Field of Search ........................... 123/193.6, 193.4, 123/46 R; 277/591, 596, 434–499; 192/155–186

(56) References Cited

U.S. PATENT DOCUMENTS

| | | | | |
|---|---|---|---|---|
| 3,400,701 A | * | 9/1968 | Tessmer ................... | 123/193.6 |
| RE31,005 E | * | 8/1982 | Prasse et al. ............... | 277/446 |
| 4,384,729 A | * | 5/1983 | Birenbaum .................. | 277/446 |
| 4,629,200 A | * | 12/1986 | Ruddy ........................ | 277/463 |
| 4,669,369 A | * | 6/1987 | Holt et al. ..................... | 92/160 |
| 5,490,445 A | * | 2/1996 | Rao et al. ...................... | 92/155 |
| 6,205,961 B1 | * | 3/2001 | Bailey et al. ............. | 123/46 R |
| 6,321,731 B1 | * | 11/2001 | Russ et al. ............. | 123/568.14 |

* cited by examiner

*Primary Examiner*—Marguerite McMahon
(74) *Attorney, Agent, or Firm*—Salter & Michaelson

(57) ABSTRACT

An internal combustion engine is disclosed that includes a piston construction having a compression ring sealing arrangement that prevents penetration of gases thereby, which gases normally produce pollution and inefficiency in gasoline consumption. The essential elimination of combustion gases and oil vapors from leaking through the compression rings effectively eliminates objectionable emissions that result in pollution and enables the vehicle in which the present invention is utilized to substantially increase its gasoline consumption efficiency; and in addition an engine incorporating the invention maintains its power output even while substantially increasing gasoline consumption efficiency.

5 Claims, 1 Drawing Sheet

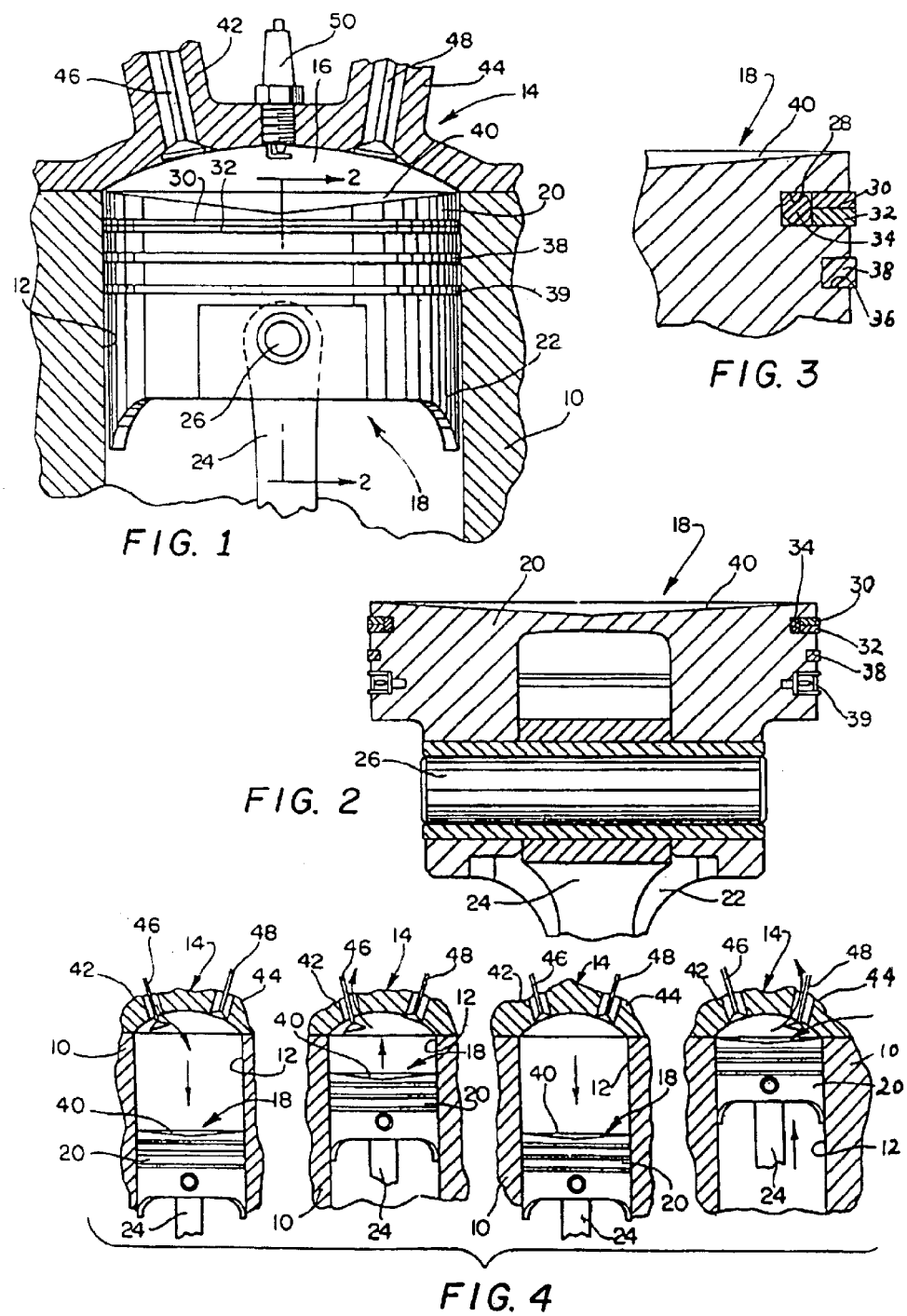

INTERNAL COMBUSTION ENGINE

BACKGROUND OF THE INVENTION

In the operation of internal combustion engines as located in the present day automotive vehicle, the engine is not only considered to be inefficient in the use of fuel but further is objectionable because of the emission of pollutants to atmosphere. Inefficient fuel consumption is known to be caused by incomplete combustion due to improper atomization of the fuel molecules and the improper mixture of oil vapors and prior combustion products with air-fuel mixture in the combustion chamber. In these prior known internal combustion engines, gases resulting from combustion leak behind the compression rings and are drawn therebelow into the crankcase of the engine. These gases in the form of vapors and as mixed with oil vapors are returned through the compression rings into the combustion chamber during the various cycles of the engine. This so-called "blow-by" of the gases and vapors through the compression rings normally results because of faulty sealing of the rings, and in most vehicles the gases and vapors which include objectionable hydrocarbons penetrate into the combustion chamber. Blow-by of the gases and vapors is particularly enhanced when the piston is located at the bottom of the power stroke, since a differential pressure is present between the combustion chamber and the crankcase and the gases will seek the lower pressure area, and in most engines will filter into the combustion chamber. Further when the combustion gases leak into the cylinder through the rings and beneath the piston they are converted into heat energy and the hydrocarbons that enter the crankcase tend to break down the viscosity of the oil therein, and then on the power stroke the resulting vapors in the form of hydrocarbons and oxides of nitrogen infiltrate through the rings into the combustion chamber. Normally such pollutants will not effectively burn on combustion and on the exhaust stroke, the piston pumps out the unburned oxides of nitrogen and hydrocarbons including carbon monoxide as emissions.

When the piston is at the bottom of the power stroke, some of the gases that filter behind the compression rings are actually trapped in the crankcase. When blow-by then occurs in an upward direction during the operating cycles of the engine the vapors include a mixture of nitrogen and oxygen that is drawn into the combustion chamber. This mixture will not effectively burn but may be ignited in the exhaust stroke which causes an increase of temperature in the combustion chamber. The resulting products which include oxides of nitrogen are then emitted to atmosphere as pollutants.

It is also not uncommon in the operation of present day internal combustion engines for some combustion to occur after the power stroke when the piston is in the down position because of a build up of hydrocarbons in the combustion chamber. This phenomena will produce so-called ping or knock. The same circumstances oftentime occur to produce detontation or shock waves that also cause pinging or knocking, thereby resulting in undue engine wear and high temperature in the crankcase and cylinder. The resulting high temperatures may cause oxygen to combine with nitrogen to produce nitric oxide that is eventually exhausted through the exhaust manifold as a pollutant. Further if such high temperature gases are discharged through the exhaust manifold, the temperature of the exhaust valve is also considerably elevated particularly on the closing thereof and on the opening of the intake valve. As a result ultraviolet rays may be emitted that tend to produce pre-ignition on the next cycle, and this can further cause detonation and knocking.

One of the common problems in the prior known internal combustion engines is the build up of carbon on the piston head, rings, valves and combustion chamber walls. If this occurs when the engine is shut-off, a so-called dieseling effect is produced that causes continued firing in the combustion chamber. In such an instance carbon is burning off the piston head, valve rings and walls, and unless corrected can produce shock waves that could be damaging to the engine. The creation of shock waves can also interfere with the harmonious movement of the flame front on the power stroke, and interference with the flame front can result in incomplete combustion. Incomplete combustion may result in the production of hydrocarbons, such as carbon monoxide and sulfer dioxide, and since these gases cannot be converted into energy before the power stroke, they are pumped out into the exhaust system as pollutants instead of being utilized for power.

When the hot combustion gases leak through the compression rings of the prior known engine they also vaporize any oil that may have been deposited on the cylinder walls. The vaporized oil in the form of hydrocarbons enters the combustion chamber by leaking back through the seals and are thereafter exhausted as pollutants. Some high temperature vapors may remain in the crankcase and will cause the viscosity of the oil to break down therein which eventually will produce engine wear. Some of the combustion gases that leak behind the compression rings form carbon and accumulates thereat. As the rings expand and contract by reason of the gap therein the carbon is dislodged and penetrates the rings and works its way into the crankcase for mixing with the oil therein. Since carbon is abrasive, the mixture thereof with the crankcase oil will eventually result in wear of the engine parts as the parts are lubricated. The carbon further causes the oil to break down in viscosity which further produces wear on the bearing surfaces. Should carbon that has resulted from combustion cling to the walls of the cylinder during the engine operation, scoring can occur on the cylinder walls, or the skirts of the piston can be scored, the scoring tending to create channels which will enable additional blow-by to occur. It is also known that carbon vapor filtering upwardly from the crankcase infiltrates in back of the compression rings, thereby urging the rings outwardly. If sufficient carbon builds up behind the rings, the rings will be forced into more positive contact with the cylinder walls to cause seizing.

The present invention is intended to overcome the above discussed objections of the internal combustion engines as known heretofore and includes a unique ring design as well as a piston design and a system of operation of the engine that not only increases the life of the engine but that further increases efficiency in the use thereof.

SUMMARY OF THE INVENTION

The internal combustion engine as embodied in the present invention comprises a conventional engine block in which a plurality of bores are formed that define cylinders. Pistons are located in said cylinders for axial movement therein, and a head assembly is mounted on the block and has a plurality of chambers formed therein each of which communicates with a cylinder to define a combustion chamber therewith. Each of the cylinders receives a piston for reciprocal movement therein. In the subject invention, the uppermost surface of the piston is constructed so as to concentrate the flame front and resulting combustion at the centermost portion of the piston, whereby an effective force resulting from combustion is produced at the center of the upper surface of the piston. In order to achieve the results as obtained by the present invention, compression rings means are provided that are installed on the piston adjacent to the uppermost end thereof for effectively sealing the piston in the cylinder in which it is mounted during the reciprocation thereof. The compression ring means includes at least one annular groove formed in the side wall of the piston and at least one non-metallic, continuously formed, non-gapped ring located in the annular groove, wherein the compression ring means extends outwardly beyond the periphery of the piston for positive contact with the adjacent walls of the cylinder in which the piston is located. The clearance between the piston head and the cylinder wall is maintained at a minimum dimension such that a pre-load imposed on the non-metallic ring by the inherent characteristics thereof constantly urges the compression ring means into contact with the cylinder wall during operation of the engine, thereby essentially preventing any blow-by of gases between the compression ring means and the cylinder wall. One of the features of the subject invention is forming the uppermost surface of the piston with an inwardly dished configuration so that the forces generated by combustion are directed essentially to the centermost portion of the upper surface of the piston.

In one form of the invention, the compression ring means includes a pair of gapped metallic rings that are located in the annular groove of the piston. The metallic rings engage the cylinder walls and the gaps in the metallic rings are disposed out of alignment with each other to further reduce blow-by between the compression ring means and the cylinder wall. In this form of the invention, the non-metallic ring is defined by an O-ring that is located in the groove rearwardly of the metallic rings, whereby the metallic rings are urged into engagement with the cylinder wall by said O-ring as a result of the pre-load imposed on said O-ring and as gases under pressure infiltrate behind the O-ring during operation of the engine.

It is also contemplated by the subject invention to either utilize a second non-metallic continuously formed non-gapped ring in a second annular groove, or to use the second non-metallic ring in place of the O-ring and the parallel metallic rings. When the second non-metallic ring is employed in the subject invention, the outer periphery thereof extends outwardly beyond the annular groove in which the ring is located and contacts the adjacent wall of the cylinder in which the piston is located. A preload in accordance with the characteristics of the second non-metallic ring urges the ring into continuous engaging and sealing relation with the wall of the cylinder to effectively seal the piston against blow-by of gases during the operating cycle of the engine. Another feature embodied in the subject invention provides for the control of the operation of the inlet valve means and the movement of the piston, wherein the inlet valve means is delayed in the open position for a substantial period of movement of the piston during the compression stroke thereof. Since the inlet valve means is delayed in the opening during the compression stroke, a portion of the unburned air-fuel mixture contained in the combustion chamber is forced back through the inlet valve means into the inlet manifold that communicates therewith. The air-fuel mixture as returned to the inlet manifold is then additionally pre-mixed, atomized and preheated before being introduced into the combustion chamber on the next operating cycle. Since the air-fuel mixture as now reintroduced into the combustion chamber is pre-mixed and pre-heated, a more efficient burning is obtained for producing effective combustion and maximum power during the power stroke.

It is also contemplated in the subject invention to reduce the volume of the combustion chamber relative to the conventional combustion chamber so that the net power obtained with a delayed closing of the inlet means during the compression stroke is substantially equivalent to a conventional construction, wherein the inlet valve means is closed during the beginning of the compression stroke. However, since the combustion chamber has been substantially reduced, the amount of fuel necessary to obtain a specific compression ratio and a required power output, is considerably reduced.

Because of the effective sealing of the piston in the cylinder and the efficient burning of the pre-heated and pre-mixed air-fuel mixture, pollutants that normally infiltrate into the combustion chamber from the crankcase and from behind the compression rings of the conventional internal combustion engine are eliminated, and thus, the subject invention provides for emissions that are essentially pollution-free.

Accordingly, it is an object of the subject invention to provide an internal combustion engine that substantially eliminates pollution in the emissions thereof, but that increases the efficiency in the operation of the engine to obtain greater MPG ratings, and not only is less fuel consumed but the life of the engine is substantially increased over the life normally expected of the prior known conventional engine.

Other objects, features and advantages of the invention shall become apparent as the description thereof proceeds when considered in connection with the accompanying illustrative drawings.

DESCRIPTION OF THE DRAWING

In the drawing which illustrates the best mode presently contemplated for carrying out the present invention:

FIG. 1 is an enlarged vertical, sectional view of a portion of an internal combustion engine illustrating the piston and sealing structure of the subject invention.

FIG. 2 is a sectional view of the piston taken along line 2—2 in FIG. 1.

FIG. 3 is an enlarged sectional view of a portion of the piston and rings mounted therein as illustrated in FIG. 2; and FIG. 4 is a diagrammatic illustration of the cylinder and piston of the engine of the subject invention showing cycles of operation thereof.

DESCRIPTION OF THE INVENTION

One of the essential features embodied in the present invention is the replacement of conventional gapped metallic compression rings as used with the piston with either a combination of a non-metallic ring and a metallic ring or just a non-metallic ring. The sealing can be accomplished with one or more of the rings as disposed in the annular grooves or lands formed in the engine piston and it is contemplated that no more than two compression rings as received in the appropriately formed lands would be utilized. The oil rings that are normally utilized in piston constructions in internal combustion engines remain as a conventional part of the piston of the subject invention.

Referring now to the drawing and particularly to FIGS. 1–3, a portion of an engine construction as embodied in the subject invention is illustrated, the engine block being indicated at 10. It is understood that the block 10 is only representative of a conventional construction and that the complete block will be formed in accordance with the particular engine design selected. Formed in the engine block 10 are a plurality of cylinders, one of which is indicated at 12. Again, the number of cylinders 12 formed in the block will be dependant on the engine design utilized. Mounted on the block 10 is a head assembly generally indicated at 14, and as will be described a combustion chamber 16 of a particular design is formed in the head assembly 14 above the cylinder 12. Mounted for reciprocating movement in the cylinder 12 is a piston generally indicated at 18 that includes a head portion 20 and a skirt 22. A connecting rod 24 is secured to the piston 18 through a wrist pin 26 in the conventional manner and provides for reciprocating movement of the piston 18 during the operation of the engine.

One of the unique features of the subject invention is the sealing of the piston 18 in the cylinder 12 during the reciprocating movement thereof. For this purpose, a unique compression ring assembly is provided and as illustrated in FIG. 3, the compression ring assembly includes at least one annular land or groove 28 in which a plurality of sealing rings are located. The sealing rings as shown in FIG. 3 that are received in the groove 28 are defined by a pair of outer metallic rings 30 and 32 of conventional construction and an inner non-metallic O-ring 34 that maybe formed of any suitable rubber or synthetic rubber material that will withstand certain temperatures as will be described. The metallic rings 30 and 32 are each split to define a gap therein the dimension of the gap being conventional for the usual compression ring. However, the gaps in the rings 30 and 32 are disposed 180° apart to limit the leakage of gases and vapors therethrough. The O-ring 34 which has a predetermined preload imposed thereon as determined by the characteristics of the material from which the O-ring is formed and the inner diameter thereof, is located interiorly of the metallic rings 30 and 32 and positively urges these rings outwardly into contact with the adjacent wall of the cylinder 12. The non-metallic O-ring 34 not only imposes a positive pressure on the metallic rings 30 and 32 to urge them outwardly into contact with the cylinder wall, but further restricts any penetration of gases through the annular groove 28 and downwardly of the piston head 20 into the crankcase of the engine. It is seen that the use of the non-metallic sealing ring 34 enables a positive seal to be obtained by the compression rings 30 and 32 that are urged into contact with the cylinder wall, thereby effectively preventing leakage and penetration of combustion gases into the crankcase. It is further seen that the seal defined by the metallic rings 30 and 32 as urged against the wall of the cylinder 12 prevents any penetration or leakage of vapors or gases that emanate from the crankcase and that in the conventional engine would normally leak behind the usual compression ring assembly for entry into the combustion chamber 16. Thus in the combination of the metal rings and the O-ring as embodied herein, the O-ring 34 not only operates as a check valve and a preloader for the compression ring assembly but also acts to increase the life and efficiency of the metal rings by constantly urging them into the sealing position against the cylinder wall.

It is known in conventional internal combustion engines that combustion gases and oil vapor that enter behind the compression rings form carbon. As the rings expand and contract in the operation thereof due to the gap formed therein, some of the accumulated carbon is dislodged from behind the rings and is carried by the gases to the crankcase for mixing with the lubricating oil therein. Since carbon is known to be abrasive, the mixture thereof with the oil eventually is deposited on the lubricated engine parts, which causes undue wear of these parts and resulting in the eventual failure or breakdown thereof. Further, the penetration of combustion gases by the compression seals and deposit of carbon in the oil and crankcase will also cause the oil to bread down in viscosity, which will also produce undue wear on the bearing members unless the oil is continually changed. Carbon can also cling to the walls of the cylinder and will cause scoring to occur thereon or on the skirts of the piston which creates channels and which would normally result in blow-by of gases therethrough. Since the conventional metallic rings may not be able to seal the scored areas, additional channels can be created, which will increase the blow-by. As is evident from the arrangement of the metallic seals 30 and 32 and the non-metallic seal 34, not only is carbon prevented from building up in the annual groove 28, but combustion gases are effectively sealed by the combination of the compression rings thereby preventing blow-by of the combustion gases into the crankcase or a return of the gases and vapors from the crankcase to the combustion chamber.

Referring again to FIG. 3, a second annular groove 36 is shown being formed in the head 20 of the piston 18 and as illustrated is spaced below the annular groove 28. The depth of the annular groove 36 is somewhat less than that of the annular groove 28 and has a configuration for receiving a non-metallic compression ring 38 that in cross-section has a square configuration. The non-metallic ring 38 may be used in combination with the sealing assembly located in groove 28, but it is also contemplated that it will be used independently thereof. Preferably, the non-metallic ring 38 is formed of a relatively heat and wear resistant material such as Rulon which is a combination of Teflon and fiberglass. The ring 38 is also preloaded so that the outermost surface thereof that extends beyond the periphery of the piston head 20 positively engages the wall of cylinder 12. The non-metallic compression ring 38 which is non-gapped so as to provide for the preloading thereof essentially prevents any blow-by of combustion gases from the combustion chamber 16 into the crankcase of the engine and when used in combination with the sealing assembly and groove 28 acts to effectively seal the combustion chamber from the lower end of the cylinder 12. It has also been determined that the non-metallic ring 38 can be used separately and apart of the sealing assembly located in the annular groove 28, and in this instance would still effectively seal the cylinder against blow-by of gases from the combustion chamber or any penetration of oil vapors or combustion gases that have escaped to the crankcase and will prevent the gases from returning to the combustion chamber.

The use of non-metallic seals in different forms have been suggested heretofor for use in piston constructions. However these prior known seals were not practical in use because of the high temperatures that were normally experienced in the combustion chambers and that were transferred to the piston heads of the prior known engines. The non-metallic rings as employed in the present invention are possible because of the relatively low operating temperatures as will be described and further because the material from which the O-ring 34 is made will resist temperatures up to 600° F. The compression ring 38 will resist temperatures up to 800° F., and since the temperature of the cylinder wall 12 at the top of the block 10 only reaches approximately 500° F. during the operation of the engine, and since there is only a split second exposure of the rings to the hot gases in the combustion chamber, the non-metallic rings 34 and 38 are not subjected to temperatures that will cause them to deteriorate. As will be described in more detail hereinafter, the relatively low temperatures as experienced in the combustion chamber of the subject invention is a result of the economic use of fuel and the mixture thereof with air. In addition the configuration of the upper surface of the piston 18 is designed to not only provide for maximum power, but acts to effectively maintain the temperatures at the top of the piston at a relatively low operating level.

As illustrated in FIGS. 1 and 2, a conventional oil ring 39 is also located in a groove formed in the piston head and functions in the usual manner.

Referring again to FIG. 1, the uppermost surface of the piston head 20 is shown being formed with concave or a dished-like configuration as indicated at 40, the dished-like shape of the upper surface 40 of the piston head acting to concentrate the flame front at the centermost portion of the upper surface of the piston at the moment of combustion. Thus, the concave surface 40 of the piston head surface directs the flame front following ignition toward the center of the piston and away from the cylinder walls and rings. This configuration basically differs from the conventional or typical piston that is champered at the outermost ends thereof, which design encourages the combustion gases to enter the area between the piston and cylinder wall. In the subject invention, an aerodynamic venturi effect is created at the time of combustion in the chamber 16 which urges the combustion gases toward the center of the piston. It is seen that because of the inverted design of the top surface of the piston 18, the piston can actually be moved upwardly to a maximum elevation in the cylinder which further insures that the combustion gases will be concentrated at the middle of the upper surface of the piston, rather than being directed to the periphery of the piston head. Further, by directing the combustion gases toward the center of the uppermost surface of the piston, the hottest part of the flame front following combustion is concentrated at top dead center of the piston for maximum efficiency in producing the power stroke. As a result of directing the hottest part of the flame front to the top dead center of the piston, the area around the cylinder walls are substantially cooler, and with the cooling effect further promoted by the water cooling jackets of the engine, there is a more efficient burning of the gases at the top dead center of the piston. It is also understood that by directing the maximum forces of combustion toward the top center of the piston the drag normally created at the periphery of the piston is substantially decreased.

When the explosion does occur at the power stroke, the resulting gases of combustion are substantially inhibited from moving through the wedge area as defined at the top of the piston head and adjacent to the periphery thereof, and since the force is concentrated at top dead center, the piston is moved downwardly with maximum force. Further, there is a built-in resistance created by the so-called venturi action of the gases as they are forced toward the wedge at the periphery of the piston, and the resultant action is to obtain maximum downward thrust on the piston. Thus it is seen that since work is a product of force×distance, more work can be accomplished by the piston construction of the subject invention because of the greater force that is created with substantially the same radius as that of the conventional piston. All of these factors cooperate to produce maximum thrust on the piston during the power stroke.

Since the uppermost surface 40 of the piston 20 is formed in an inverted or dish-shaped configuration, an angle "a" illustrated in FIG. 2 is defined by the vertical axis of the piston and the top surface thereof, it is apparent that the angle "a" must always be maintained at less than 90° since any angle thereof that is greater than 90° would mean that the top of the piston is either flat or convex, which configuration would deflect the flame front outwardly toward the periphery of the piston.

One of the unique features of the subject invention is obtaining substantially complete atomization of the fuel molecules prior to combustion. It is known that the more complete atomization or homogenization of the fuel enables the oxygen molecules to more effectively encircle each molecule of fuel thereby obtaining maximum burning at the time of combustion. It is also known that atomization of the fuel should occur along the entire intake manifold from the carburetor to the combustion chamber and even continue up to the time of combustion which begins the power stroke.

Referring now to FIG. 1, the head assembly 14 in which the combustion chamber 16 is located is shown including an intake manifold 42 and an exhaust manifold 44. It is understood that the intake and exhaust manifolds as illustrated are only representative of more complete intake and exhaust systems normally used in automotive vehicles. The intake manifold 42 communicates with an opening as formed in the head assembly 14 at the combustion chamber 16, an intake valve 46 being located in the intake manifold 42 for controlling the introduction of the air-fuel mixture therefrom through the opening and into the combustion chamber 16. Located in the exhaust manifold 44 is an exhaust valve 48 that controls the exhaust of combustion products from the combustion chamber 16 in the exhaust stroke of the operating cycle of the engine. A spark plug 50 of conventional design is also mounted in the head assembly 14 and extends into the combustion chamber 16 and is periodically fired in accordance with the engine cycle for producing combustion as is well known in the art.

In order to more completely atomize the air-fuel mixture as introduced into the combustion chamber 16, the closing of the intake valve 46 is delayed during the compression stroke whereby a portion of the air-fuel mixture that has been previously introduced into the combustion chamber is forced back into the intake manifold 42. By pushing a portion of the previously introduced air-fuel mixture from the combustion chamber 16 into the manifold 42 upon the compression stroke and before the piston 18 reaches the top of the stroke in the cylinder 12, the expelled air-fuel mixture is preheated and premixed with the incoming air-fuel mixture to more completely atomize the mixture which results in more complete combustion. Further, and as will be described hereinafter the delay in closing the intake valve during the compression stroke provides for reducing of the volume of the combustion chamber but without any reduction in the desired compression ratio. Thus in the present invention less fuel is necessary for introduction into the combustion chamber 16 since part of the air-fuel mixture as introduced into the chamber is pumped out for preheating and mixing with the air-fuel mixture in the intake manifold. As the pre-mixed and pre-heated air-fuel mixture is reintroduced into the combustion chamber, it is seen that more complete atomization of the fuel has been obtained and therefore more efficient or complete combustion or burning of the fuel occurs.

As described, since the intake valve 46 is delayed in closing on the compression stroke approximately one-half of the air-fuel mixture is forced outwardly of the combustion chamber 16 in the compression stroke thereof and into the intake manifold 42. When the intake manifold closes just prior to combustion in the power stroke, approximately only one-half of fuel normally introduced into the combustion chamber is burned. Thus, by reducing the clearance volume of the head as indicated and as will be described, the expansion ratio of the engine is increased. Further by reducing the clearance volume of the head which defines the volume of the combustion chamber a relatively high compression ratio can be obtained, the compression ratio desired being obtained through selected valve timing.

As shown more clearly in FIG. 1, the combustion chamber 16 illustrated therein is relatively reduced in volume with respect to the conventional combustion chamber and is also reduced in volume relative to the volume of the cylinder 12. As previously described, it is possible to maintain a reduced volume of the combustion chamber or clearance over the piston head 20 by adjusting the timing of the intake valve 46 so that it remains open for a substantial travel of the piston 18 in its upward direction during the compression stroke. By reducing the clearance volume of the head assembly and retaining the intake valve in the open position until the piston has moved approximately one-half the length of the cylinder, the same compression ratio is obtained as the conventional engine which is provided with a clearance head of greater volume and where the fuel mixture is introduced into the combustion chamber as the piston begins the upward stroke in the compression cycle. Thus in the present invention less time is required for the compression stroke and this in turn will reduce the time energy losses due to heat can be incurred.

Although not shown a carburetor of conventional design is incorporated in the fuel delivery system and functions to mix the air and fuel in the usual manner. The mixture is then directed to the intake manifold in which additional mixing, atomizing and preheating occurs with the mixture that has been pumped out of the combustion chamber by the advancing piston. Thus the premixing as described is accomplished by valve timing and it is seen that in the operation of the engine of the subject invention, the faster the mixture burns as a result of more efficient atomization and harmonization of the air fuel mixture, the faster the flame front will expand following combustion. The faster the flame front expands on combustion, the greater the force will be that is exerted on the piston head. The greater the force or thrust that is exerted on the piston head the faster the piston will move on the power stroke, and the faster the piston moves on the power stroke the more work is done. As is evident all of this is accomplished with substantially less fuel being used than in the normal and conventional engine.

It is also understood that the greater the air/fuel ratio, the more atomization and harmonization of the mixture occurs and more work is accomplished with correspondingly less fuel used. Further, the faster or more rapid are the expansion of the combustion gases, the cooler the gases are. Since the combustion gases as expanded are cooler, the more availability of the use of non-metallic seals in the compression ring assembly. Thus, in the present invention the cooler gases that are obtained as a result of the rapid expansion of the gases at combustion makes more feasible the use of the non-metallic seals such as the O-ring 34 or the Rulon ring 38 in the piston assembly.

Another advantage in the delayed closing of the intake valve during the compression stroke is realized because of the corresponding delayed counteracting force exerted on a coupled mating piston moving in the power stroke. Thus the piston in the compression stroke travels one-half of the length of its cylinder with the intake valve open. As a result, the mating piston does not have a counteracting force exerted therein during this travel, and more torque and consequently more horse power can be generated due to the less counteracting or negative force of the piston traveling in the first half of the compression stroke.

Because of the effective seals created by the use of the sealing assemblies and principally the O-ring 34 or the Rulon ring 38, the diameter of the piston 18 may be dimensioned approximately the same diameter as that of the cylinder bore, except that some provision must be made for expansion of the metal materials. Since there is essentially little clearance under load between the periphery of the piston 18 and the cylinder wall 12 the non-metallic rings effectively seal against any infiltration of carbon therethrough. By using the soft sealing rings, that is, either the O-ring 34 or the Rulon ring 38 or a combination of both, effective compression is rapidly obtained and in addition there is less blow-by through the rings. Since the gases expand rapidly upon combustion because of better atomization and harmonization of the air-fuel mixture, cooling occurs at a more rapid rate yet the combustion gases cannot attack the non-metallic sealing rings. The piston acts to protect the non-metallic sealing rings because of the tight fit therebetween and the cylinder wall. The less the clearance is between the piston and the cylinder wall, the less chance of build-up behind the rings, and as a result, the less opportunity for combustion gases and carbon to infiltrate into the crankcase. The cooler operating conditions also enable a wider spark gap to be used, and it is contemplated that a gap of 0.05 in. Or more may be utilized to obtain an efficient flame front. With a wider spark gap more fuel can enter the gap, thereby resulting in more rapid ignition and a better flame front.

Finally, referring now to FIG. 4, a complete cycle of the engine as described herein is illustrated and as shown is substantially conventional in that on the suction stroke, the intake valve 46 is open and the exhaust valve 48 is closed. However, during compression the intake valve 46 remains open until the piston 18 has advanced more than halfway upwardly in the cylinder 12. As previously described, a portion of the unburned air-fuel mixture is pumped outwardly by the piston 18 into the intake manifold 42 for better atomization and harmonization, and thereafter the intake valve is closed during the combustion or power stroke. The cycle is completed when the piston 18 is moved upwardly to pump out the combustion products from the combustion chamber.

It is seen that the present invention provides an internal combustion engine that includes a piston construction having a specific sealing arrangement that prevents blow-by of gases therethrough which normally would produce pollution and decrease gasoline consumption efficiency. By eliminating the blow-by of the combustion products through the seals of the piston, the exhaust of these products as hydrocarbons or oxides of nitrogen through the exhaust valve on the exhaust stroke as pollutants is eliminated. Further, the more efficient the mixing of the fuel and reduced clearance volume above the cylinder dramatically decrease the amount of fuel used in the operation of the engine and the head structure design not only effects a maximum turbulence of the fuel mixture when it is introduced into the combustion chamber, but enables a maximum balance of the air-fuel ratios to be obtained in all of the engine cylinders.

By obtaining a homogenized and atomized air-fuel mixture in the intake manifold, the engine can be designed to have an identical compression ratio in each cylinder and the same ratio of air-fuel mixture can be introduced into all of the engine combustion chambers. This will produce an aerodynamically balanced engine. The engine will also operate more quietly because there will be little or no piston slap against the cylinder walls. Scoring of the walls of the cylinder and piston skirts is virtually eliminated by the new engine design embodied herein and the usual channels created by such scoring is avoided. Blow-by of gases through the seals is essentially prevented and reduction in rated compression ratios is also prevented. By eliminating blow-by, noise and pollution are also substantially eliminated.

A substantial advantage in the operation of the engine is that heat losses are greatly reduced since the work output is obtained in approximately one-half the period of time normally experienced. Further the expansion ratio on the power stroke is greater and the piston head operates at cooler temperature levels. A higher vacuum is created in each cylinder and by opening the exhaust valve just before the piston reaches bottom dead-center on the power stroke, a differential pressure in the exhaust manifold is created that promotes rapid scavenging of the combustion products from the combustion chamber and cylinder. Since the exhaust products begin to leave the combustion chamber and cylinder before the piston begins the upstroke in the exhaust cycle, there is less drag on the piston and the result is a more efficient operation of the engine.

One of the advantages of the non-metallic ring is that it is not split as is normally required in metallic rings and can be stretched over the piston head and snapped into its groove in the piston. In the case of the Rulon ring 38, the groove 36 is formed one-half the usual ring depth which enables the ring to be easily snapped in place. Since its inside diameter thereof need not be unduly stretched to fit over the piston head, the built-in memory of the O-ring 36 also enables it to be conveniently snapped in place with a positive fit in its groove.

By using the non-metallic rings and more efficiently atomizing the air-fuel mixture, pollution in the subject engine is reduced to a level wherein hydrocarbons in the exhaust products have been measured at only five parts per million thereof.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An internal combustion engine, comprising an engine block in which a plurality of bores are formed that define cylinders a piston located for axial movement in each of said cylinders, a head assembly mounted on said block and having a plurality of chambers formed therein, each of which communicates with a cylinder to define a combustion chamber therewith, each of said cylinders having a piston mounted for reciprocation therein, the uppermost surface of said piston being constructed so as to concentrate the flame front and resulting combustion at the centermost portion of said piston, wherein an effective force resulting from combustion is produced, and compression ring means located on said piston adjacent to the uppermost end thereof for effectively sealing said piston in the cylinder in which it is mounted during the reciprocation thereof, said compression ring means including at least one annular groove formed in said piston and at least one non-metallic continuously formed non-gapped ring located in said annular groove, wherein said compression ring means extends outwardly beyond the periphery thereof for positive contact with the adjacent wall of the cylinder in which the piston is located, the clearance between the piston head and the cylinder wall being maintained at a minimum dimension such that a pre-load imposed on said non-metallic ring by the inherent characteristics thereof constantly urges said compression ring means into contact with the cylinder wall during operation of the engine, thereby essentially preventing any blow-by of gases between the compression ring means and the cylinder wall, said compression ring means further including a pair of gapped metallic rings located in said annular groove, said metallic rings engaging the cylinder wall, and the gaps in said metallic rings being disposed out of alignment with each other to further reduce blow-by between said compression ring means and the cylinder wall, said non-metallic ring comprising an O-ring that is located in said annular groove inwardly of said metallic rings, wherein said metallic rings are urged into engagement with said cylinder wall by said O-ring as a result of the pre-load imposed on said O-ring and as oases under pressure infiltrate behind said O-ring during operation of said engine.

2. An internal combustion engine, com rising an engine block in which a plurality of bores are formed that define cylinders a piston located for axial movement in each of said cylinders, a head assembly mounted on said block and having a plurality of chambers formed therein, each of which communicates with a cylinder to define a combustion chamber therewith, each of said cylinders having a piston mounted for reciprocation therein, the uppermost surface of said piston being constructed so as to concentrate the flame front and resulting combustion at the centermost portion of said piston, wherein an effective force resulting from combustion is produced, and compression ring means located on said piston adjacent to the uppermost end thereof for effectively seating said piston in the cylinder in which it is mounted during the reciprocation thereof, said compression ring means including at least one annular groove formed in said piston and at least one non-metallic continuously formed non-gapped ring located in said annular groove, wherein said compression ring means extends outwardly beyond the periphery thereof for positive contact with the adjacent wall of the cylinder in which the piston is located, the clearance between the piston head and the cylinder wall being maintained at a minimum dimension such that a pre-load imposed on said non-metallic ring by the inherent characteristics thereof constantly urges said compression ring means into contact with the cylinder wall during operation of the engine, thereby essentially preventing any blow-by of gases between the compression ring means and the cylinder wall, inlet valve means including an inlet manifold communicating with said combustion chamber for introducing an air-fuel mixture therein, and outlet valve means including an exhaust manifold communicating with said combustion chamber through which products of combustion are exhausted following the power stroke of said piston, and means for controlling the operation of said inlet valve means and piston, wherein said inlet valve means is delayed in the open position for a substantial period of movement of said piston during the compression stroke thereof, so that a portion of the unburned air-fuel mixture in said combustion chamber is forced back through said inlet valve means into said inlet manifold that communicated therewith.

3. An internal combustion engine as claimed in claim 2, the volume of said combustion chamber being educed so that the net power obtained with a delayed closing of said inlet valve means during the compression stroke is substantially equivalent to a conventional construction in which the inlet valve means is closed during the beginning of the compression stroke.

4. In an internal combustion engine, a cylinder, a piston mounted for reciprocation in said cylinder, a cylinder head mounted on said cylinder for enclosing said piston and having a combustion chamber formed therein, said piston having at least one annular groove formed therein adjacent to the uppermost end thereof, and sealing ring means including at least one non-metallic continuously formed ring located in said annular groove, wherein said sealing ring means extends outwardly beyond the periphery of said piston for contact with an adjacent wall of said cylinder, the clearance between said piston and said cylinder wall being relatively small and such that a pre-load on said non-metallic ring as determined by the characteristics of the non-metallic material from which said ring is formed, constantly urges said sealing ring means into contact with the wall of said cylinder during operation of said engine, wherein blow-by of gases between said ring and cylinder wall during the operating cycles of said engine is prevented, said sealing ring means further including a pair of metallic rings each of which is formed with a gap therein, said metallic rings being located in said annular groove such that they project outwardly of the periphery of said piston, and said non-metallic ring being located in said annular groove inwardly of said metallic rings and urging said metallic rings outwardly into contact with the cylinder wall, the gaps in said metallic rings being disposed approximately 180° apart, and said non-metallic ring being formed in an O-ring configuration.

5. In an internal combustion engine, a cylinder, a piston mounted for reciprocation in said cylinder, a cylinder head mounted on said cylinder for enclosing said piston and having a combustion chamber formed therein, said piston having at least one annular groove formed therein adjacent to the uppermost end thereof, and sealing ring means including at least one non-metallic continuously formed ring located in said annular groove, wherein said sealing ring means extends outwardly beyond the periphery of said piston for contact with an adjacent wall of said cylinder, the clearance between said piston and said cylinder wall being relatively small and such that a pre-load on said non-metallic ring as determined by the characteristics of the non-metallic material from which said ring is formed, constantly urges said sealing ring means into contact with the wall of said cylinder during operation of said engine, wherein blow-by of gases between said ring and cylinder wall during the operating cycles of said engine is prevented, inlet valve means including an inlet manifold communicating with said combustion chamber for introducing an air-fuel mixture therein, outlet valve means including an exhaust manifold communicating with said combustion chamber through which products of combustion are exhausted following the power stroke of said piston, and means for delaying the closing of said inlet valve means for a substantial period of movement of said piston during the compression stroke thereof, wherein a portion of the unburned air-fuel mixture in said combustion chamber is forced back through said inlet valve means into said inlet manifold.

\* \* \* \* \*